United States Patent
Niggemeier et al.

(10) Patent No.: US 10,815,891 B2
(45) Date of Patent: Oct. 27, 2020

(54) INNER DIFFUSER CASE STRUTS FOR A COMBUSTOR OF A GAS TURBINE ENGINE

(71) Applicant: United Technologies Corporation, Hartford, CT (US)

(72) Inventors: Chris J. Niggemeier, Manchester, CT (US); Karl D. Blume, Hebron, CT (US); John H. Mosley, Portland, CT (US); Andreas Sadil, Newington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 828 days.

(21) Appl. No.: 14/432,442

(22) PCT Filed: Sep. 27, 2013

(86) PCT No.: PCT/US2013/062145
§ 371 (c)(1),
(2) Date: Mar. 30, 2015

(87) PCT Pub. No.: WO2014/052737
PCT Pub. Date: Apr. 3, 2014

(65) Prior Publication Data
US 2015/0252729 A1 Sep. 10, 2015

Related U.S. Application Data

(60) Provisional application No. 61/707,016, filed on Sep. 28, 2012.

(51) Int. Cl.
*F02C 7/20* (2006.01)
*F23R 3/02* (2006.01)
*F01D 25/28* (2006.01)
*F01D 9/06* (2006.01)
*F02C 6/08* (2006.01)
*F23R 3/50* (2006.01)
*F02C 3/13* (2006.01)
(Continued)

(52) U.S. Cl.
CPC ............... *F02C 7/20* (2013.01); *F01D 9/065* (2013.01); *F01D 25/24* (2013.01); *F01D 25/28* (2013.01); *F02C 3/13* (2013.01); *F02C 6/08* (2013.01); *F02C 7/04* (2013.01); *F23R 3/02* (2013.01); *F23R 3/50* (2013.01)

(58) Field of Classification Search
CPC ...... F23R 3/42; F02C 6/08; F02C 7/00; F02C 7/22; F02C 7/20; F01D 5/08; F01D 25/24; F01D 25/28
See application file for complete search history.

(56) References Cited

U.S. PATENT DOCUMENTS

| | | |
|---|---|---|
| 3,452,542 A | 7/1969 | Saferstein |
| 3,750,397 A | 8/1973 | Cohen et al. |
| 4,098,074 A | 7/1978 | Greenberg et al. |

(Continued)

OTHER PUBLICATIONS

EP search report for EP13842492.4 dated Nov. 14, 2015.
Office action for EP13842492.4 dated Jul. 27, 2018.

*Primary Examiner* — Craig Kim
(74) *Attorney, Agent, or Firm* — Getz Balich LLC

(57) ABSTRACT

An inner diffuser case for use in a combustor of a gas turbine engine includes a multiple of struts across an annular flow path between an outer shroud and an inner shroud, at least one of the multiple of struts is an open strut.

2 Claims, 7 Drawing Sheets

(51) Int. Cl.
*F01D 25/24* (2006.01)
*F02C 7/04* (2006.01)

(56) References Cited

U.S. PATENT DOCUMENTS

| | | | |
|---|---|---|---|
| 4,653,267 A | | 3/1987 | Brodell et al. |
| 4,918,926 A | | 4/1990 | Nikkanen |
| 5,632,141 A | * | 5/1997 | Sloop .................... F01D 17/105 60/751 |
| 5,778,658 A | | 7/1998 | Lamando, Jr. et al. |
| 8,387,358 B2 | * | 3/2013 | Danis ....................... F02C 3/305 60/39.53 |
| 2007/0122265 A1 | | 5/2007 | Ansari et al. |
| 2009/0067984 A1 | * | 3/2009 | Rofka ....................... F01D 3/04 415/107 |
| 2010/0307165 A1 | * | 12/2010 | Wong ....................... F01D 25/162 60/796 |
| 2011/0020116 A1 | | 1/2011 | Hashimoto et al. |
| 2011/0185699 A1 | | 8/2011 | Danis et al. |
| 2012/0186261 A1 | | 7/2012 | Toprani et al. |

* cited by examiner

INNER DIFFUSER CASE STRUTS FOR A COMBUSTOR OF A GAS TURBINE ENGINE

Applicant hereby claims priority to PCT Patent Application No. PCT/US2013/062145 filed Sep. 27, 2013, which claims priority to U.S. Patent Application No. 61/707,016 filed Sep. 28, 2012, the disclosures of which are herein incorporated by reference.

BACKGROUND

The present disclosure relates to a gas turbine engine and, more particularly, to a combustor section therefor.

Gas turbine engines, such as those that power modern commercial and military aircraft, generally include a compressor to pressurize an airflow, a combustor for burning a hydrocarbon fuel in the presence of the pressurized air, and a turbine to extract energy from the resultant combustion gases. The compressed air from the compressor section passes between stator vanes, then through a diffuser section. The diffuser has an expanding cross sectional area in the direction of the airflow to decrease the velocity and increase the static pressure of the air. This prepares the air for entry into a combustion section at low velocity to permit proper mixing with fuel.

In gas turbine engines of the twin spool type, leakage of high pressure compressor discharge air through a labyrinth seal between a high pressure compressor rear rotor shaft and the diffuser section typically establishes the thrust loads on component parts such as thrust bearings.

This air is also used downstream in the engine for cooling purposes, particularly, the bearing compartment and the high pressure turbine. Air that is cooler than the environment surrounding the bearing compartment, is bled from the mid-stage compressor either through an anti-vortex tube directing the compressor bleed air radially inward to the engine's shaft where it flows axially to the environment surrounding the mid-frame bearing compartment, or externally from the mid high pressure compressor case to the bearing compartment, then used to supply cooling to portions of the high pressure turbine rotor.

SUMMARY

An inner diffuser case for use in a combustor of a gas turbine engine according to one disclosed non-limiting embodiment of the present disclosure includes an outer shroud, an inner shroud, an annular flow path defined by and between the outer and inner shrouds and a multiple of struts extending across the annular flow path wherein at least one of said multiple of struts is an open strut.

In a further embodiment of the foregoing embodiment, the multiple of struts include a multiple of open struts. In the alternative or additionally thereto, in the foregoing embodiment the multiple of open struts communicate a secondary flow air. In the alternative or additionally thereto, in the foregoing embodiment the secondary flow air provides a thrust balance.

A combustor section of a gas turbine engine according to another disclosed non-limiting embodiment of the present disclosure includes an inner diffuser case with at least one open strut.

In a further embodiment of the foregoing embodiment, the inner diffuser case defines an annular flow path. In the alternative or additionally thereto, in the foregoing embodiment the at least one open strut extends across said annular flow path.

In a further embodiment of any of the foregoing embodiments, the combustor section includes a forward assembly of a combustor immediately downstream of said inner diffuser case.

In a further embodiment of any of the foregoing embodiments, the combustor section includes an outer diffuser case mounted to said inner diffuser case.

A method of communicating secondary flow air in a combustor section of a gas turbine engine according to another disclosed non-limiting embodiment of the present disclosure includes communicating a secondary flow air through a strut across an annular flow path of an inner diffuser case.

In a further embodiment of the foregoing embodiment, the method includes providing a thrust balance with the secondary flow air.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
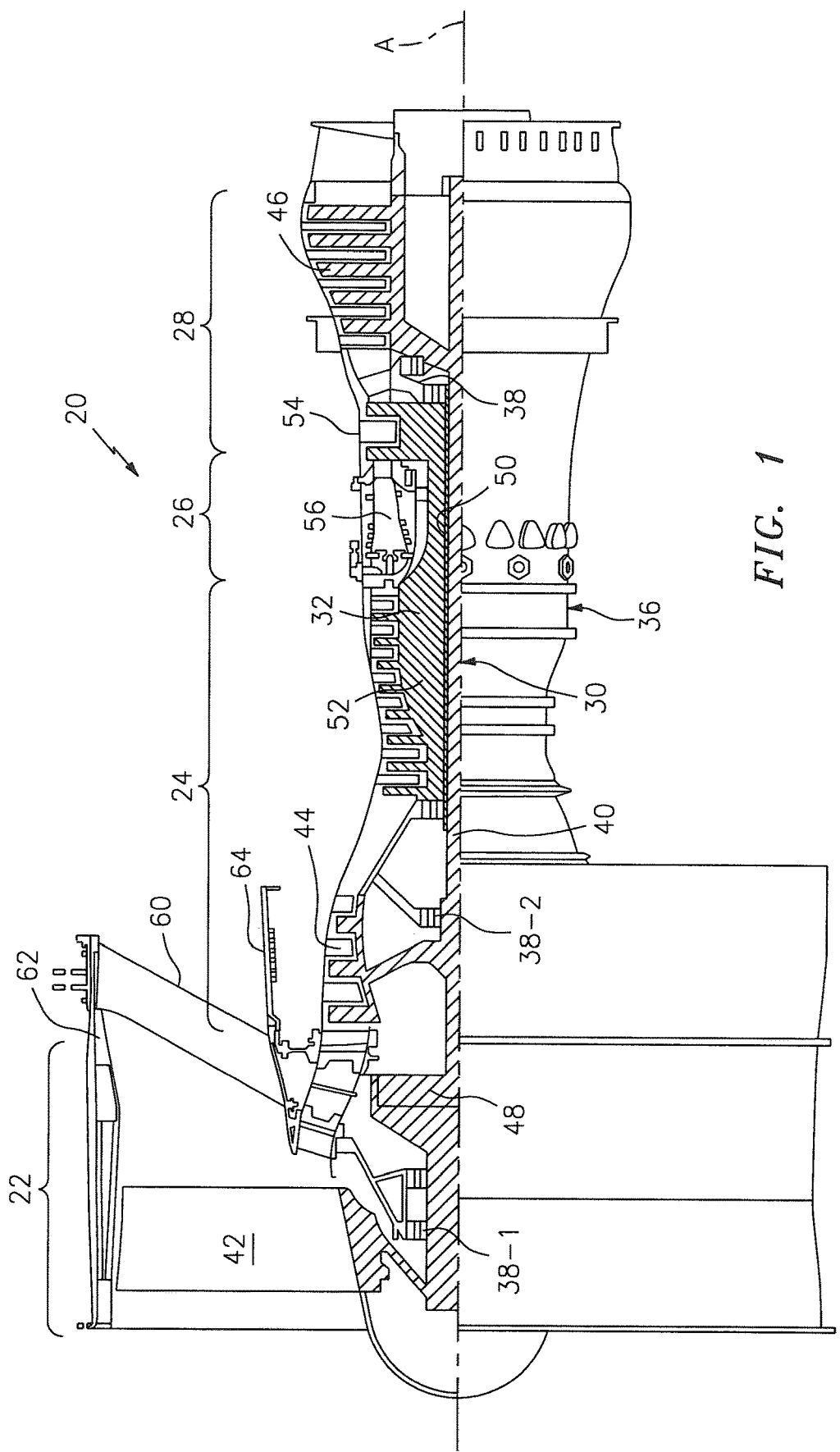
FIG. 1 is a schematic cross-section of a gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by bearing structures 38 within the static structure 36. It should be understood that various bearing structures 38 at various locations may alternatively or additionally be provided.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the low pressure compressor 44 and low pressure turbine 46 and render increased pressure in a fewer number of stages.

A pressure ratio associated with the low pressure turbine 46 is pressure measured prior to the inlet of the low pressure turbine 46 as related to the pressure at the outlet of the low pressure turbine 46 prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 44, and the low pressure turbine 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("T"/$518.7^{0.5}$) in which "T" represents the ambient temperature in degrees Rankine. The Low Corrected Fan Tip Speed according to one non-limiting embodiment of the example gas turbine engine 20 is less than about 1150 fps (351 m/s).

Figure 2:
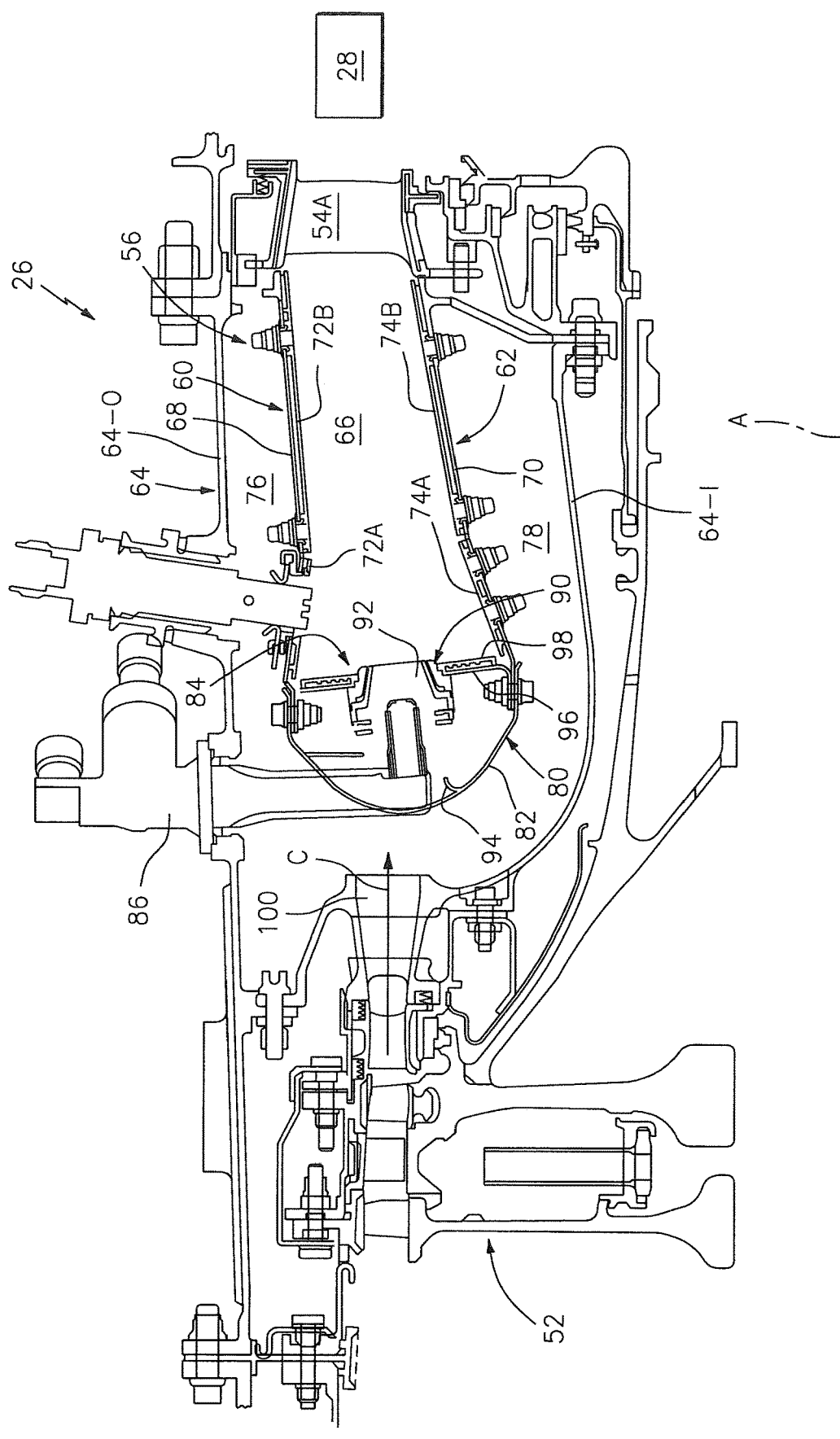
FIG. 2 is a partial longitudinal schematic sectional view of a combustor section according to one non-limiting embodiment that may be used with the gas turbine engine shown in FIG. 1.

With reference to FIG. 2, the combustor 56 generally includes an outer combustor wall 60, an inner combustor wall 62 and a diffuser case module 64. The outer combustor wall 60 and the inner combustor wall 62 are spaced apart such that a combustion chamber 66 is defined therebetween. The combustion chamber 66 is generally annular in shape. The outer combustor wall 60 is spaced radially inward from an outer diffuser case 64-O of the diffuser case module 64 to define an annular outer plenum 76. The inner combustor wall 62 is spaced radially outward from an inner diffuser case 64-I of the diffuser case module 64 to define an annular inner plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

The combustor walls 60, 62 contain the combustion products for direction toward the turbine section 28. Each combustor wall 60, 62 generally includes a respective support shell 68, 70 which supports one or more liners 72, 74 mounted to a hot side of the respective support shell 68, 70. The liners 72, 74, often referred to as Impingement Film Float (IFF) wall panels define a generally rectilinear liner array which define the annular combustor chamber 66. Each of the liners 72, 74 may be generally rectilinear and manufactured of, for example, a nickel based super alloy, ceramic or other temperature resistant material. In one disclosed non-limiting embodiment, the array includes a multiple of forward liners 72A and a multiple of aft liners 72B that line the hot side of the outer shell 68 and a multiple of forward liners 74A and a multiple of aft liners 74B that line the hot side of the inner shell 70.

The combustor 56 further includes a forward assembly 80 immediately downstream of the compressor section 24 to receive compressed airflow therefrom. The forward assembly 80 generally includes an annular hood 82, a bulkhead assembly 84, a multiple of fuel nozzles 86 (one shown) and a multiple of fuel nozzle guides 90 (one shown). Each of the fuel nozzle guides 90 is circumferentially aligned with one of the hood ports 94 to project through the bulkhead assembly 84. Each bulkhead assembly 84 includes a bulkhead support shell 96 secured to the combustor walls 60, 62, and a multiple of circumferentially distributed bulkhead heatshields segments 98 secured to the bulkhead support shell 96 around the central opening 92.

The annular hood 82 extends radially between, and is secured to, the forwardmost ends of the combustor walls 60, 62. The annular hood 82 includes a multiple of circumferentially distributed hood ports 94 that accommodate the respective fuel nozzle 86 and introduce air into the forward end of the combustion chamber 66 through a central opening 92. Each fuel nozzle 86 may be secured to the diffuser case module 64 and project through one of the hood ports 94 and through the central opening 92 within the respective fuel nozzle guide 90.

The forward assembly 80 introduces core combustion air into the forward end of the combustion chamber 66 while the remainder enters the annular outer plenum 76 and the annular inner plenum 78. The multiple of fuel nozzles 86 and surrounding structure generate a blended fuel-air mixture that supports combustion in the combustion chamber 66.

Opposite the forward assembly 80, the outer and inner support shells 68, 70 are mounted to a first row of Nozzle Guide Vanes (NGVs) 54A in the HPT 54. In one disclosed non-limiting embodiment, thirty-two (32) NGVs 54A are located immediately downstream of the combustor 56 as the first static vane structure upstream of a first turbine rotor in the turbine section 28. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 3:
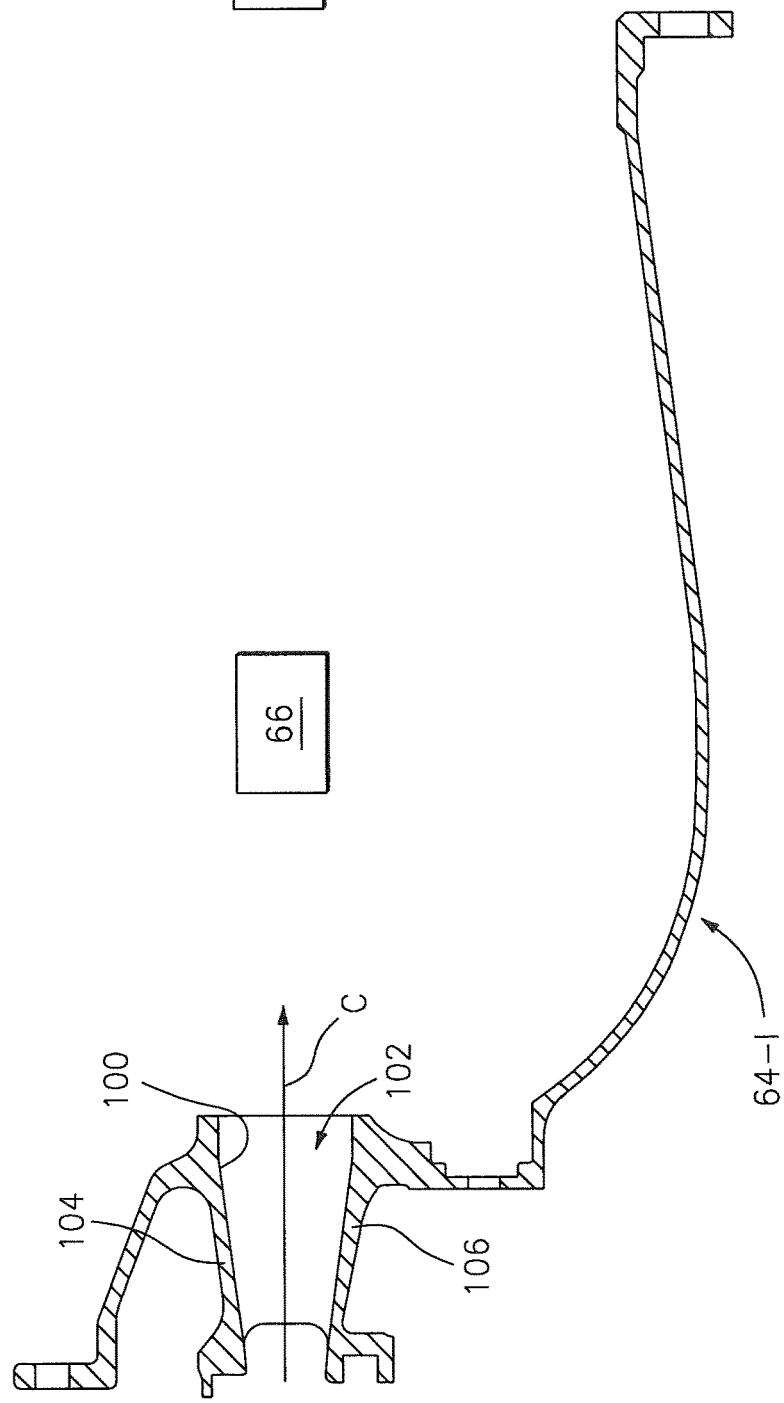
FIG. 3 is a partial longitudinal schematic sectional view of an inner diffuser case.

With reference to FIG. 3, the inner diffuser case 64-I defines an annular flow path 100 (FIG. 4) for compressed airflow C from the upstream HPC 52. The annular flow path 100 includes a multiple of struts 102 which extend in a radial direction between an outer shroud 104 and an inner shroud 106

Figure 4:
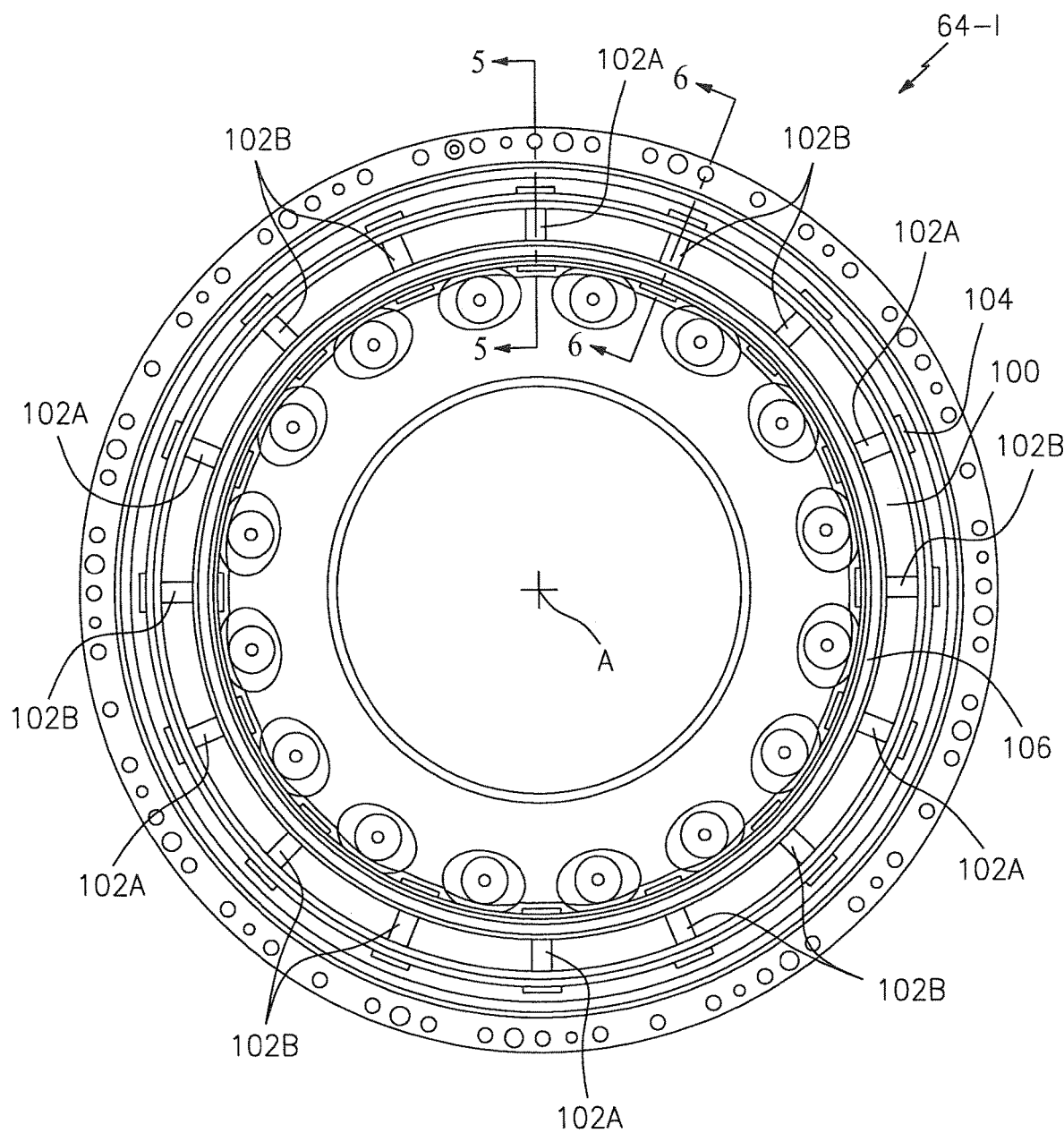
FIG. 4 is a front view of the inner diffuser case.
Figure 5:
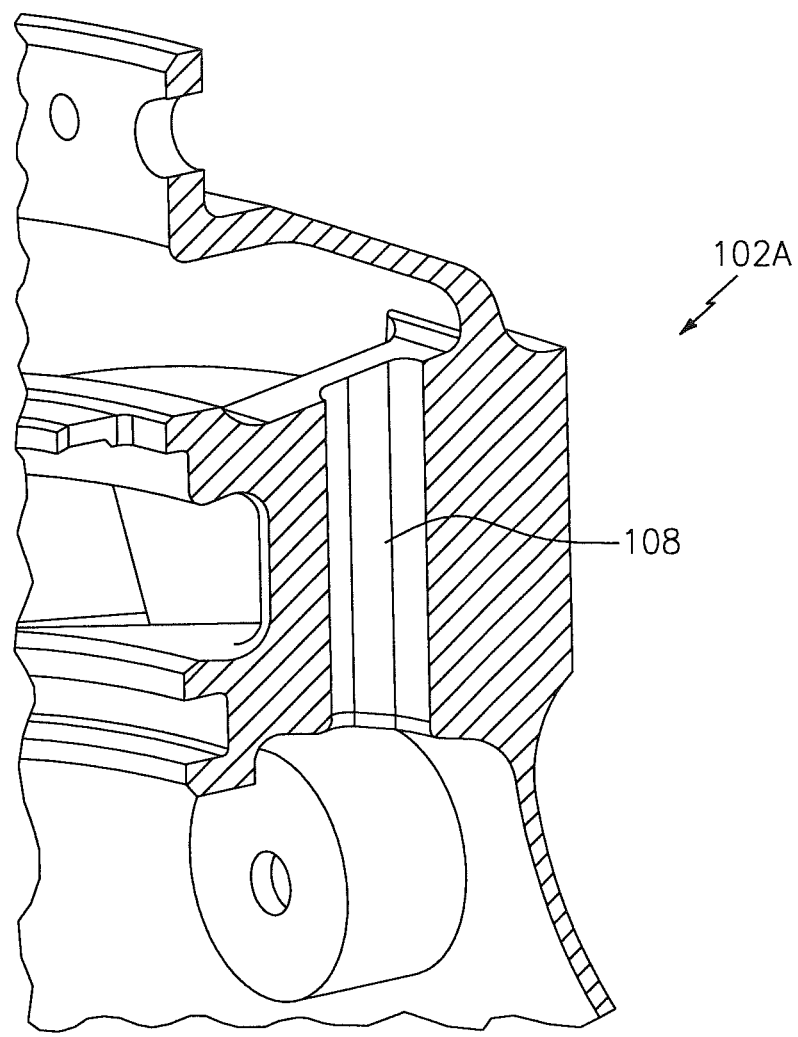
FIG. 5 is a sectional view of an open strut of the inner diffuser case taken along line 5-5 in FIG. 4.
Figure 6:
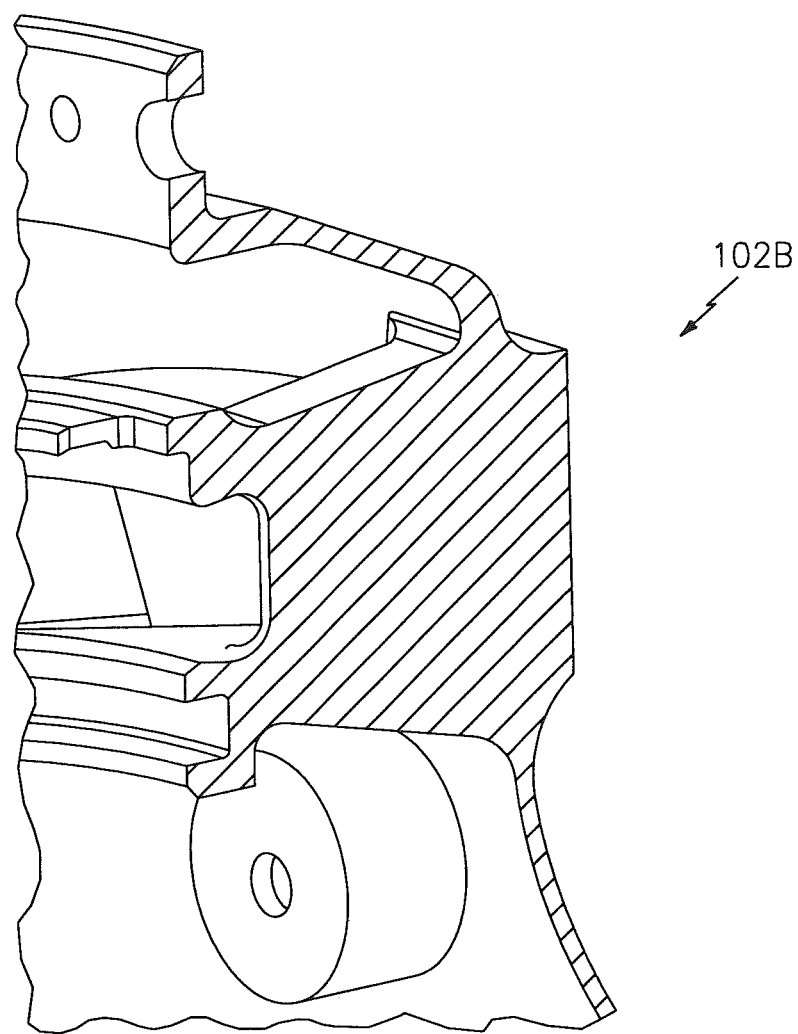
FIG. 6 is a sectional view of a solid strut of the inner diffuser case taken along line 6-6 in FIG. 4.

With reference to FIG. 4, the multiple of struts 102 of the inner diffuser case 64-I include a multiple of open struts 102A (FIG. 5) and a multiple of solid struts 102B (FIG. 6). It should be appreciated that although a particular number of open struts 102A and solid struts 102B are illustrated, any number will benefit herefrom.

Figure 7:
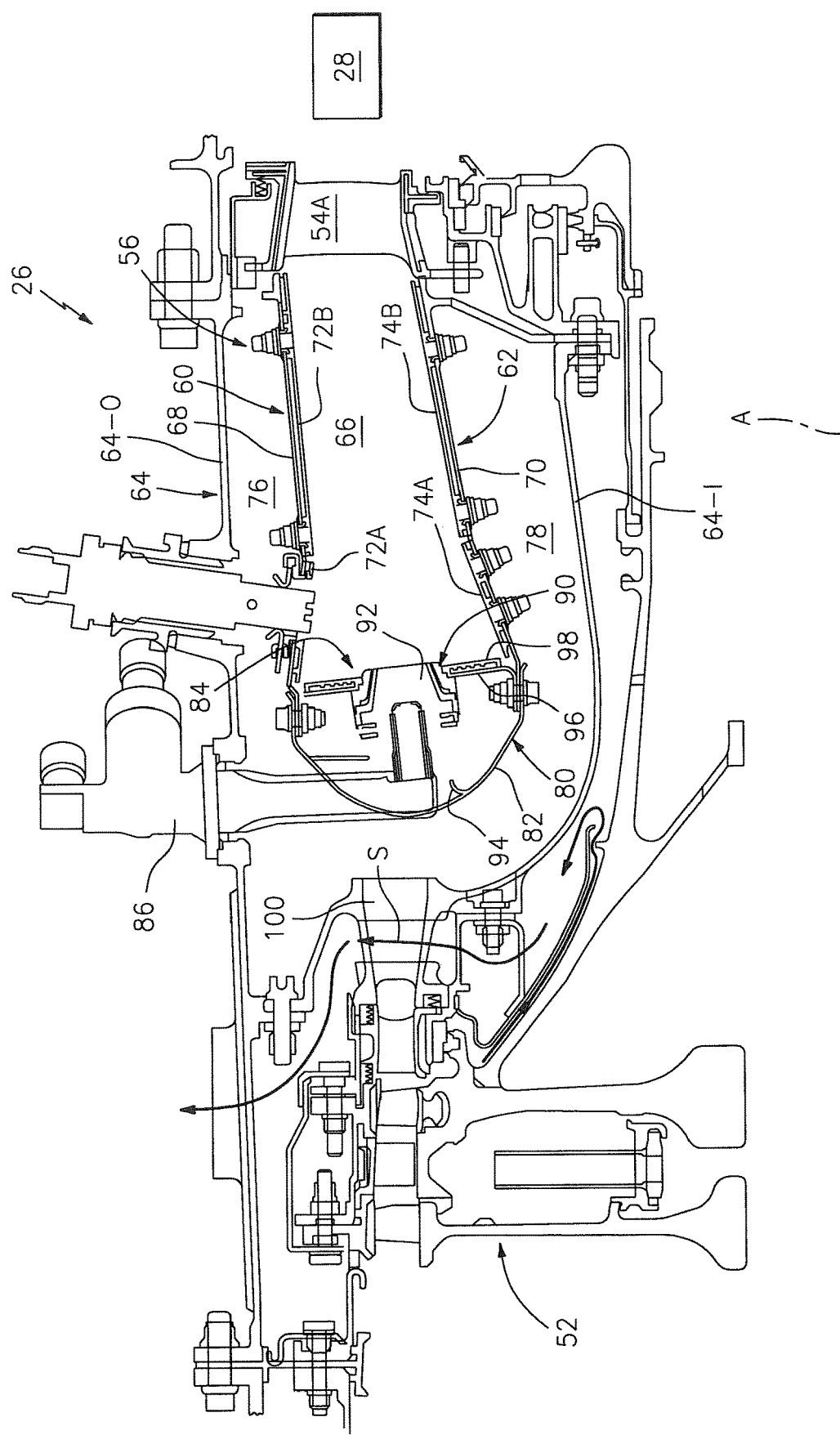
FIG. 7 is a schematic view of the open strut of the inner diffuser case.

With reference to FIG. 7, the multiple of open struts 102A provides a metered flow path with passages 108 for secondary flow air illustrated schematically by arrows S). This secondary flow air S is typically sourced from the compressor section 24 and may be utilized, for example, as the reaction force to the axial forces on the high spool 32 (FIG. 1) such that the bearing structures 38 (see FIG. 1) on which the outer shaft 50 is supported has an acceptable level of axial load or thrust balance. Generally, aerodynamic and pressure forces exert an axial load on the outer shaft 50 through the compressor section 24 and the turbine section 28. While the compressor section 24 driven by the turbine section 28 can compensate to some degree for a net axially downstream force in the turbine section 28, a rotor thrust bearing, as designated generally by the numeral 38, is normally required to fully absorb the axial thrust forces. The axial loads absorbed by the bearing structures 38 is thereby assisted or supplemented by differential pressures generated with a metered flow of the secondary flow air S on each side of the compressor section 24 and/or the turbine section 28. Consequently, the maximum thrust force which is to be absorbed by the thrust bearings is reduced.

In order to achieve this axial thrust balance, the secondary flow air S is metered by the relationship of, for example, the number of open struts 102A (FIG. 5) with respect to the multiple of solid struts 102B as well as the size of the passages 108 to provide a specific flow area to obtain the desired pressure at the desired locations. That is, the total cross sectional area of the passages 108 of the open struts 102A may be utilized to control the high compressor module rear side/aft pressure as desired.

The inner diffuser case 64-I strut arrangement incorporates passages 108 for secondary flow air S which locate the metering function directly into the part detail casting which reduces cost, increases the functions of the inner diffuser case 64-I and provides an efficient secondary air flow path.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An inner diffuser case for use in a combustor of a gas turbine engine comprising:
    an outer shroud;
    an inner shroud;
    an annular flow path defined by and between the outer and inner shrouds; and
    a multiple of struts extending across the annular flow path, the multiple of struts including a multiple of open struts and a multiple of solid struts; and
    wherein a first of the multiple of open struts is arranged circumferentially between and adjacent to an adjacent pair of the multiple of solid struts.

2. An inner diffuser case for use in a combustor of a gas turbine engine comprising:
    an outer shroud;
    an inner shroud;
    an annular flow path defined by and between the outer and inner shrouds; and
    a multiple of struts extending across the annular flow path, the multiple of struts including a multiple of open struts and a multiple of solid struts; and
    wherein a first of the multiple of solid struts is arranged circumferentially between and adjacent to a first of the multiple of open struts and a second of the multiple of solid struts; and the second of the multiple of solid struts is arranged circumferentially between and adjacent to the first of the multiple of solid struts and a second of the multiple of open struts.

* * * * *